July 29, 1941.  S. L. DE BRUIN  2,250,471
PRESSURE MEASURING DEVICE
Filed March 10, 1939
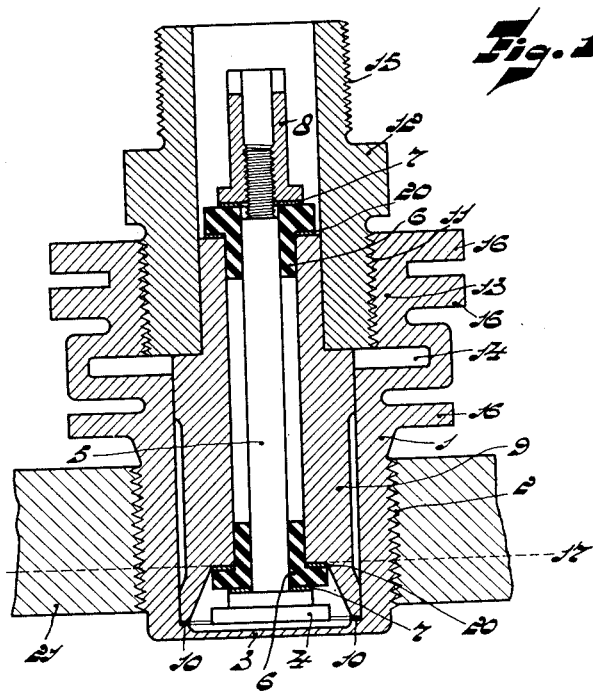
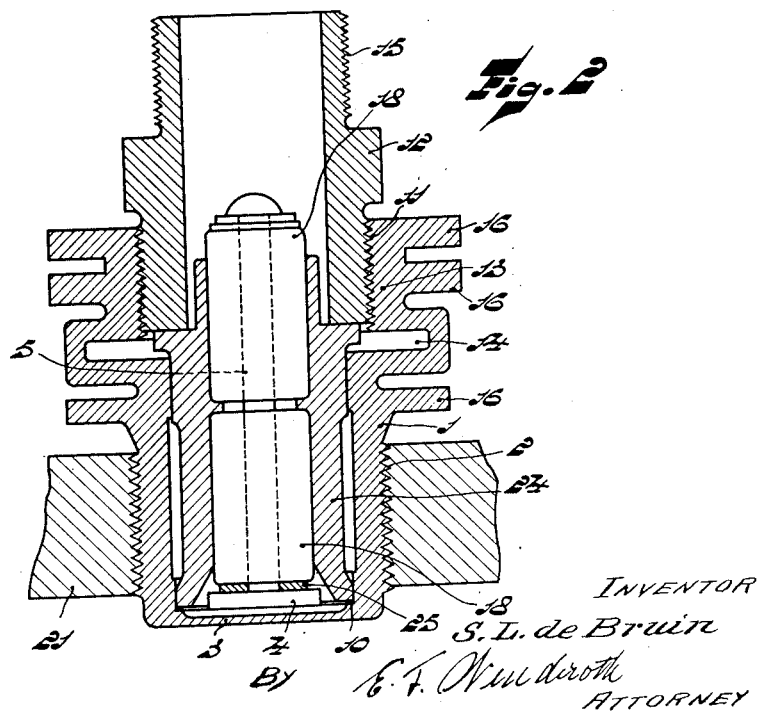
INVENTOR
S. L. de Bruin
BY E. F. Wenderoth
ATTORNEY Patented July 29, 1941

2,250,471

UNITED STATES PATENT OFFICE 2,250,471

PRESSURE MEASURING DEVICE

Sake Leendert de Bruin, Eindhoven, Netherlands, assignor, by mesne assignments, to Hartford National Bank and Trust Company, Hartford, Conn., as trustee Application March 10, 1939, Serial No. 261,097
In the Netherlands March 12, 1938

4 Claims. (Cl. 175—41.5)

My invention relates to a device for use in measuring pressures in a fluid, and more particularly to a device for converting pressure variations into capacity variations.

The device according to the invention, with which the pressures to be measured are converted into capacity variations which can be electrically indicated or recorded, is particularly useful in making time-pressure diagrams and may be placed, for example, in an aperture of the cylinder wall of a steam or internal combustion engine, of a gun, or of the spray pipe of a Diesel engine.

Such a device must completely seal the aperture and must be capable of withstanding high pressures without damage. Furthermore, the capacity variations must not be affected by the variable high temperature occurring in such engines.

The object of my invention is to provide a device which completely satisfies the above conditions, and for this purpose I use a cup-shaped metal housing which is secured in the aperture by screw threads or similar means, and has a bottom portion which acts as one electrode of a condenser and is adapted to be displaced by the pressure being measured. Within the housing and insulatingly supported therefrom, I provide a counter electrode, the capacity between this electrode and the bottom portion of the housing being used to measure the variations in the pressure of the fluid.

In order that the capacity measurements will be independent of temperature variations, I so support the counter electrode from the housing that the distance between the electrodes does not vary with temperatures, and in some cases employ certain materials for the housing and supports for the counter electrode.

In order that the invention may be clearly understood and readily carried into effect, I shall describe the same in more detail with reference to the accompanying drawing, in which, Figure 1 is a sectionized side view of a device according to one embodiment of the invention.

Fig. 2 is a sectionized side view of a device according to another embodiment of the invention.

The device illustrated in Figure 1 comprises a cup-shaped metal housing 1 provided with screw threads 2 by which the device is secured in a threaded aperture of the wall 21 of a body containing the fluid whose pressure is to be measured. Housing 1 is provided with a bottom portion 3, or diaphragm, of reduced thickness which acts as one electrode and whose lower surface is in contact with the fluid to be measured, and a shoulder 10 at the periphery of this portion. At the upper end of the housing are three cooling ribs 16, the upper one being of hexagonal shape to allow the device to be applied and removed by means of a socket wrench. The housing is also provided with a groove 14 for purposes later to be described.

Within the cavity of the housing 1 and bearing with its lower surface on shoulder 10 is a metal bushing 9. A hollow nut 12 having a threaded lower end cooperating with threads 11 of housing 1 bears with its lower surface on a shoulder of bushing 9. Upon tightening nut 12, bushing 9 is pressed against shoulder 10, and due to the resiliency afforded by the U-shaped portion formed by groove 14 remains pressed thereto at all times. The upper part of nut 12 is externally threaded to allow for attachment of other parts of the apparatus.

Passing through the bore of bushing 9 is a metal pin 5 having a threaded upper end and a plate-shaped lower end 4 acting as a counter electrode. Pin 5 is insulatingly supported from bushing 9 by members 6 of insulating material, for instance porcelain, gaskets 7 and 20, and a nut 8 which also serves as a terminal for the electrode 4.

Thus the capacity being measured is that between the lower surface of plate 4 and the upper surface of portion 3, and upon changes in pressure of the fluid being measured, the portion 3 will be displaced so as to change the capacity between this portion and plate 4.

The electrode 3 is grounded to the wall 21, whereas the electrode 4 can be connected through nut 8 to a device for measuring capacity variations, for instance to a cathode-ray oscillograph (not shown). By measuring the capacity between electrodes 3 and 4 it is possible to obtain an indication of the variation in pressure of the fluid.

In the construction illustrated, the capacity measurements will be practically independent of temperature variations because the bushing 9 is supported by the shoulder 10 at the periphery of portion 3. More particularly, disregarding variations due to pressure, any variation in the distance between the adjacent surfaces of electrodes 3 and 4 would be caused by expansion or contraction in only the part of bushing 9 and which lies below a plane indicated by the dotted line 17 and the part of pin 5 which lies below gasket 7. As these parts are subjected to the same temperatures, the expansion and contraction therein will compensate each other.

When the device is heated the surface of the shoulder of bushing 9 at line 17 will be raised a distance equal to the amount of expansion in the portion of bushing 9 between line 17 and the shoulder 10. Since pin 5 is always in tension, the upper surface of the electrode portion 4 will always be at the same distance, i. e. the thickness of gaskets 6, 7 and 20, from the shoulder of bushing 9 at line 17. However, there will be expansion in the end portion 4 itself, i. e. in the portions of pin 5 below gasket 7. Thus, any upper displacement of the lower surface of electrode portion 4 due to expansion of the portion of bushing 9 below line 17 is compensated by a downward displacement of this surface due to expansion in the portion of pin 5 below the gasket 7.

If desired the capacity between electrodes 3 and 4 can be made entirely independent of temperature variations by using certain materials for pin 5 and bushing 9. For example, I may make the pin of brass and the bushing of steel.

The device shown in Figure 2 is similar in many respects to that shown in Figure 1, and the same parts are indicated by similar reference numerals. However, in Figure 2 the pin 5 passes through two tubular insulating members 18, for instance of ceramic material, and is secured thereto by rivetting over its upper end. The members 18 are secured on the base of bushing 24 by a shrink fit, a gasket 25 being interposed between the electrode 4 and the lower insulating member 18.

While I have described my invention in connection with specific constructions, I do not desire to be limited to the exact details of the constructions shown and described, for obvious modifications will occur to one skilled in this art.

What I claim is:

1. A device for converting pressure variations in a fluid into capacity variations, comprising a metal housing having a bottom portion adapted to be displaced by the fluid, a metal member within said housing and having a surface in spaced relationship with the surface of said bottom portion, said member and bottom portion acting as electrodes of a condenser, and means to maintain constant the distance between said member and bottom portion, said means comprising a metal bushing within said housing and having one end supported at the periphery of said bottom portion, said metal member being insulatingly supported from said bushing at a point near the bottom portion of the housing.

2. A device for converting pressure variations in a fluid into capacity variations, comprising a cup-shaped metal housing having a bottom portion adapted to be displaced by the fluid and provided at its upper end with internal screw threads, a metal member within said housing and having a surface in spaced relationship with the surface of said bottom portion, said member and bottom portion acting as electrodes of a condenser, a bushing in said housing and having its lower end bearing on the periphery of said bottom portion, a hollow nut cooperating with said screw threads to press said bushing against said bottom portion, and means insulatingly supporting said member from said bushing.

3. A device for converting pressure variations in a fluid into capacity variations, comprising a cup-shaped metal housing having a bottom portion adapted to be displaced by the fluid and an upper portion provided with internal screw threads, a metal member within said housing and having a surface in spaced relationship with the surface of said bottom portion, elastic means between said upper and bottom portions, said member and bottom portion acting as the electrodes of a condenser, a metal bushing within said housing and bearing with one end on the periphery of said bottom portion, a hollow nut cooperating with said threads to clamp said bushing in place, and means insulatingly supporting said member from said bushing.

4. A device for converting pressure variations in a fluid into capacity variations, comprising a cup-shaped metal housing having a bottom diaphragm portion adapted to be displaced by the fluid, a metal member within said housing and having a plate-shaped portion in spaced relationship with said bottom portion, said plate-shaped portion and bottom portion acting as electrodes of a condenser, a bushing in said housing and bearing with one end on the periphery of said bottom portion, and means insulatingly supporting said member from said bushing at a point adjacent the bottom portion of the housing and including a ceramic member embraced by said bushing.

SAKE LEENDERT DE BRUIN.